Feb. 23, 1926.  
J. H. LONG  
MARKER FOR CORN PLANTERS  
Filed Dec. 28, 1923  
1,574,161  
2 Sheets-Sheet 1
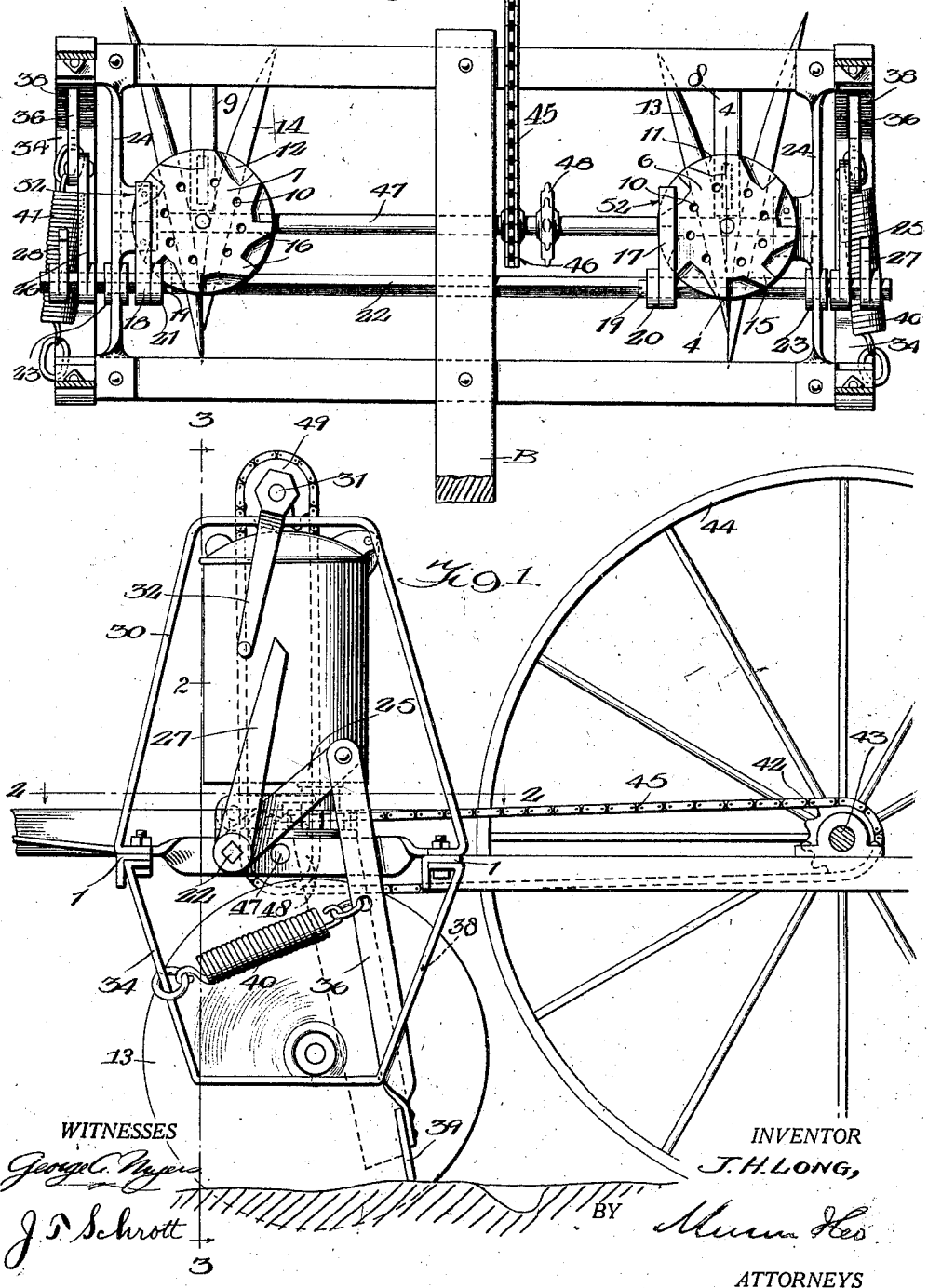
INVENTOR  
J. H. LONG,  
BY  
ATTORNEYS
WITNESSES

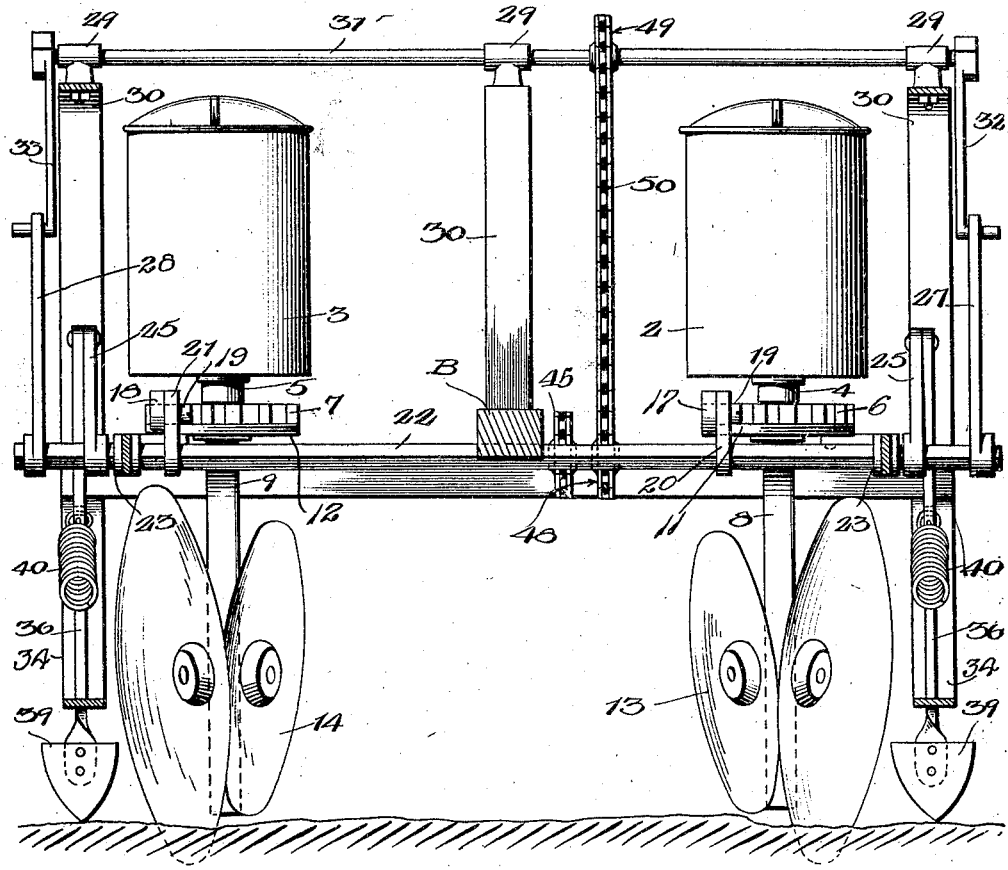
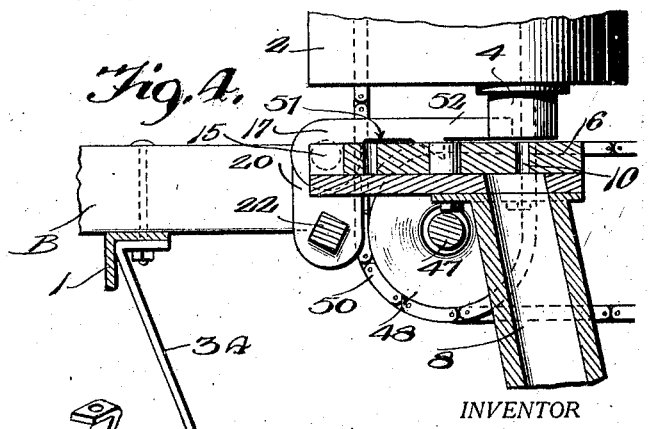
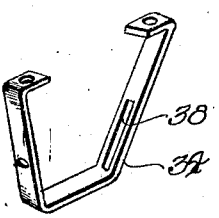

Patented Feb. 23, 1926.

1,574,161

UNITED STATES PATENT OFFICE.

JOHN H. LONG, OF ASHTABULA, OHIO.

MARKER FOR CORN PLANTERS.

Application filed December 28, 1923. Serial No. 683,223.

*To all whom it may concern:*

Be it known that I, JOHN H. LONG, a citizen of the United States, residing at Ashtabula, in the county of Ashtabula, State of Ohio, have invented certain new and useful Improvements in Markers for Corn Planters, of which the following is a specification.

My invention relates to improvements in corn planters, and an object of the invention is to provide a corn planter having devices for marking places in the ground where seeds have been dropped, reference being had to the accompanying drawings, in which:—

Figure 1 is a side elevation, parts in section, of enough of a corn planter to illustrate the application of the invention, Figure 2 is a section on the line 2—2 of Figure 1, Figure 3 is a vertical section on the line 3—3 of Figure 1.

Figure 4 is a detail section taken substantially on the line 4—4 of Figure 2 and illustrating the mechanism for operating the seed dropping disc.

Figure 5 is a detail perspective view of one of the U-shaped brackets hereinafter referred to.

Corn planters as commonly known generally employ a check rower wire which is stretched from one end of a field to the other. This wire has lugs at intervals which are intended to operate the seed dropping mechanism when the corn planter is run along the wire. The stretching and moving of the wire consumes time, and its use has other disadvantages which become manifest upon consideration of the arrangement.

The improved corn planter has mechanism by which the seed dropping discs are operated automatically, and without the aid of any external device such as the wire spoken of above. The corn planter comprises a frame which is composed of a pair of transverse angle irons 1. As these are the only members of the frame which have any bearing on the invention the remainder of the frame is omitted from the illustration.

Seed boxes 2 and 3 are supported by the frame in any ordinary manner. In this instance, these contain corn. The seed boxes have short spouts 4 and 5 which terminate on top of seed discs 6 and 7 at places out of alignment with the conduits 8 and 9.

Each seed disc is perforated at 10 at a plurality of places, and when the seed discs turn beneath the spouts 4 and 5 seeds enter the perforations and temporarily rest on closure plates 11 and 12 until the discs have turned far enough to bring the then filled perforation into registration with the conduits. Thereupon the seed falls to the ground and into a furrow opened by the discs 13 and 14.

Each seed disc is peripherally toothed, at 15 and 16, so that it may be operated by dogs 17 and 18, respectively. These dogs are pivotally carried at 19 by short upright arms 20 and 21 on a non-circular transverse shaft 22. This shaft carries sleeves 23 which furnish a bearing therefor in brackets 24. These run lengthwise of the machine and connect the angle irons 1 mentioned above.

It is to be observed that the dogs 18 and 19 rest on top of the discs 6 and 7. This indicates that they are held in place by gravity. Each dog is sufficiently undercut at 51 (Fig. 4) to provide sufficient clearance for the tooth next preceding when the disc is turned through the medium of the dog. The extremity of each dog terminates in a heel 52 which provides an ample rest for the dog on the teeth.

The shaft 22 is hereinafter known as the checker shaft. It carries marker arms 25 and 26 and trip arms 27 and 28 at the respective extremities as clearly shown in Figures 2 and 3. Mounted in bearings 29 on brackets 30 and in a position above the seed boxes is a crank shaft 31 which has cranks 32 and 33 to periodically engage the trip arms 27 and 28. This is done simultaneously so that the turning movement of the checker shaft 22 is uniform.

U-shaped brackets 34, complementary to the brackets 30, furnish guides for the marker shanks 36 which are pivotally carried by the arms 25 and 26 and extend through slots 38 (Fig. 5) formed in the brackets for the purpose. The lower extremity of the marker shank carries a marker or spade 39 which is intended to excavate a small portion of earth and thus mark the place where seed has been dropped.

Springs 40 and 41 keep the marker shanks in engagement with the fronts of the slots 38 so that there may be no undue looseness of the parts. These springs are connected between the shanks and the fronts of the brackets that guide them.

Driving means for the crank shaft 31 is furnished by a sprocket 42 on the axle 43 (Fig. 1) of the corn planter. This axle carries the ground wheels 44 by which the machine is supported. A chain 45 from the sprocket 42 drives a sprocket 46 on a counter-shaft 47 situated between the angle irons 1 and supported by the brackets 24. This counter-shaft has a sprocket 48 which drives a sprocket 49 on the shaft 31 by means of a chain 50. The motion of the crank shaft 31 is continuous while the corn planter is in operation. The turning of the checker shaft 22, and consequently the operation of the dropping discs 6 and 7, is intermittent.

The operation may be readily understood from the foregoing description. The corn planter is drawn across the field by means of draft animals hitched to the beam B according to the general custom. The forward motion of the corn planter turns the crank shaft 31 and the cranks 32 and 33 in the counter-clockwise direction (Fig. 1). Each engagement of the trip arms 27 and 28 by said cranks produces a turn of the checker shaft 22. This results in the marker arms 25 and 26 moving downward and the dog arms 20 and 21 rearward.

The actions of turning the dropping discs 6 and 7 by means of the dogs 17 and 18, and depressing the spades 39 into the ground are simultaneous, or substantially so. As the machine proceeds forwardly the spades 39 will dig out a portion of the earth and thus mark the places where seeds are dropped. The slight turning of the dropping discs cause a certain one of each of the series of apertures 10 to move across the openings of the conduits 8 and 9 leading from the closure plates beneath so that seeds are released.

While the construction and arrangement of the improved corn planter as herein described and claimed is that of a generally preferred form, obviously modifications and changes may be made without departing from the spirit of the invention or the scope of the claim.

I claim:

In a planter, a checker shaft, a frame having U-shaped bracket supported beneath the frame, a slot in said bracket, an arm on the checker shaft, a shank carried thereby passing through said slot, a spade carried by said shank, and means including a spring holding the shank in engagement with a portion of the slot, said spring having one end attached to one leg of said bracket and the opposite end to said shank.

JOHN H. LONG.